(12) United States Patent
Jeong

(10) Patent No.: US 11,736,526 B2
(45) Date of Patent: Aug. 22, 2023

(54) I2NSF CONSUMER-FACING INTERFACE YANG DATA MODEL

(71) Applicant: Research & Business Foundation Sungkyunkwan University, Suwon-si (KR)

(72) Inventor: Jaehoon Jeong, Busan (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 481 days.

(21) Appl. No.: 16/937,805

(22) Filed: Jul. 24, 2020

(65) Prior Publication Data
US 2021/0029168 A1    Jan. 28, 2021

(30) Foreign Application Priority Data

Jul. 24, 2019  (KR) .................. 10-2019-0089890
Nov. 4, 2019   (KR) .................. 10-2019-0139816
Mar. 9, 2020   (KR) .................. 10-2020-0029292
Jul. 13, 2020  (KR) .................. 10-2020-0086232

(51) Int. Cl.
*H04L 9/40* (2022.01)

(52) U.S. Cl.
CPC .......... *H04L 63/20* (2013.01); *H04L 63/0263* (2013.01); *H04L 63/1458* (2013.01)

(58) Field of Classification Search
CPC .. H04L 63/20; H04L 63/0263; H04L 63/1458
USPC ............................................ 726/1
See application file for complete search history.

(56) References Cited

U.S. PATENT DOCUMENTS

| | | | | |
|---|---|---|---|---|
| 10,511,630 | B1* | 12/2019 | Weiss .............. | H04L 63/20 |
| 10,735,249 | B2* | 8/2020 | Baum .............. | H04L 41/0846 |
| 10,783,581 | B2* | 9/2020 | Raleigh ........... | H04W 4/24 |
| 11,012,299 | B2* | 5/2021 | Janakiraman .... | H04L 41/0893 |
| 2016/0248860 | A1* | 8/2016 | Dunbar ............ | H04L 67/146 |
| 2019/0158517 | A1* | 5/2019 | Muddu ............ | H04L 63/20 |
| 2019/0349426 | A1* | 11/2019 | Smith .............. | H04L 9/0825 |
| 2020/0059492 | A1* | 2/2020 | Janakiraman .... | H04L 41/0893 |
| 2020/0235990 | A1* | 7/2020 | Janakiraman .... | H04L 45/44 |

* cited by examiner

*Primary Examiner* — Dereena T Cattungal
(74) *Attorney, Agent, or Firm* — NSIP Law

(57) ABSTRACT

The present disclosure, in a method for providing a security service by a security controller in a security management system, is receiving a high-level first security policy from an interface to network security functions (I2NSF) user via a consumer-facing interface.

12 Claims, 36 Drawing Sheets

[FIG. 1]
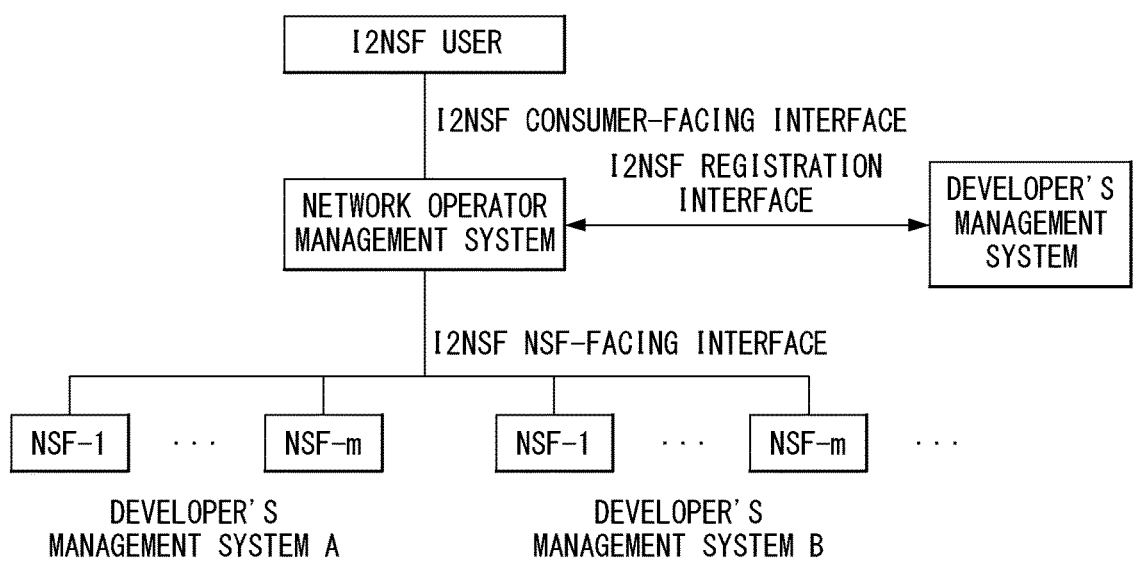

[FIG. 2]
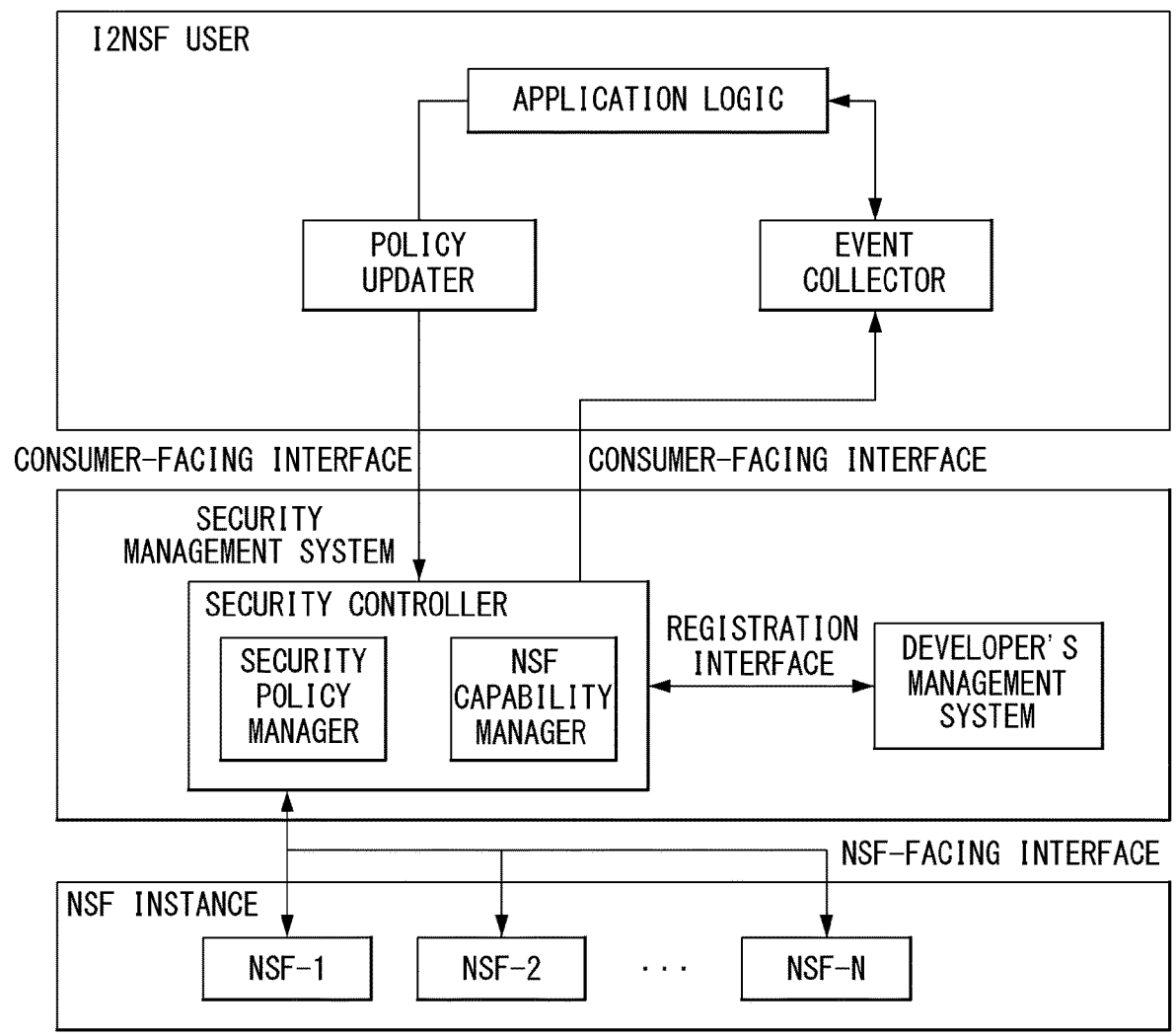

【FIG. 3】
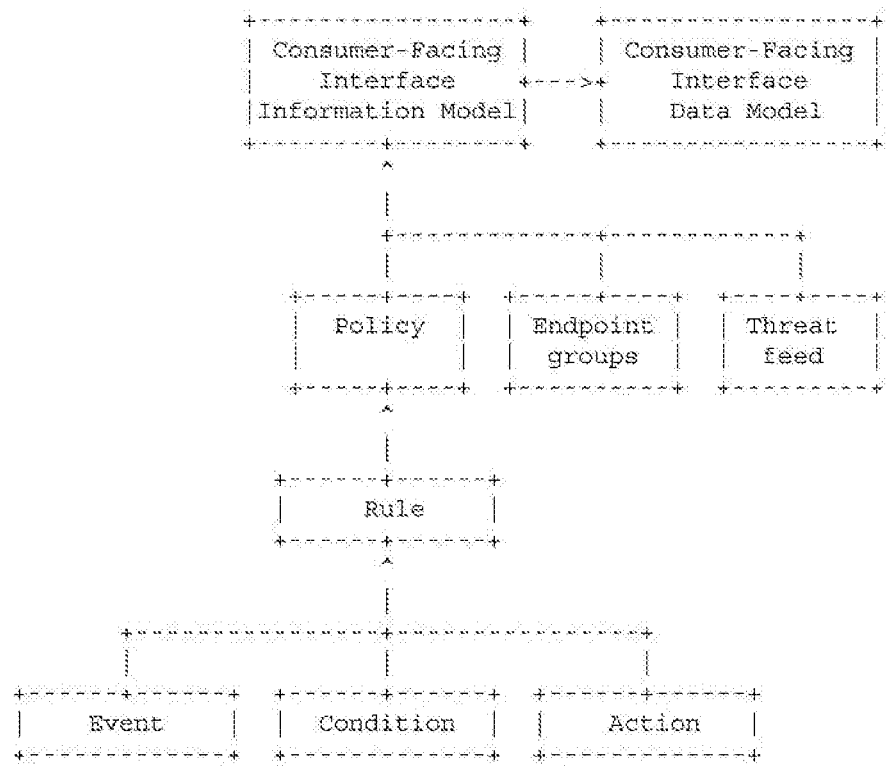
【FIG. 4】
```
+--rw i2nsf-cfi-policy* [policy-name]
   +--rw policy-name           string
   +--rw rules
   +--rw endpoint-groups
   +--rw threat-prevention
```
【FIG. 5】
```
+--rw rules* [rule-name]
   +--rw rule-name    string
   +--rw event
   +--rw (condition)?
   +--rw action
   +--rw ipsec-method
```

[FIG. 6]

```
+--rw event
   +--rw security-event       identityref
   +--rw time-information
   |  +--rw start-date-time?   yang:date-and-time
   |  +--rw end-date-time?     yang:date-and-time
   |  +--rw period
   |  |  +--rw start-time?     time
   |  |  +--rw stop-time?      time
   |  |  +--rw day*            identityref
   |  |  +--rw date*           int32
   |  |  +--rw month*          string
   +--rw frequency?            enumeration
```

[FIG. 7]

```
+--rw condition
   +--:firewall-condition
   |  +--rw source       -> /../../user-group/name
   |  +--rw destination* -> /../../user-group/name
   +--:ddos-condition
   |  +--rw source*      -> /../../device-group/name
   |  +--rw destination* -> /../../device-group/name
   |  +--rw rate-limit
   |     +--rw packet-threshold-per-second? uint32
   +--:location-condition
   |  +--rw source*      -> /../../location-group/name
   |  +--rw destination  -> /../../location-group/name
   +--:custom-condition
   |  +--rw source*      -> /../../payload-content/name
   |  +--rw destination  -> /../../payload-content/name
   +--:threat-feed-condition
      +--rw source*      -> /../../threat-feed-list/name
      +--rw destination  -> /../../threat-feed-list/name
```

[FIG. 8]

```
+--rw action
   +--rw primary-action       identityref
   +--rw secondary-action?    identityref
```

【FIG. 9】

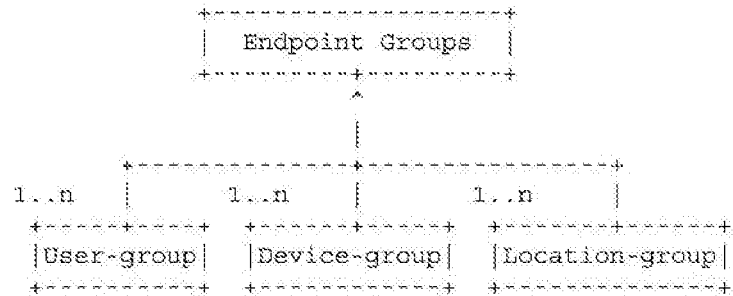

【FIG. 10】

```
+--rw endpoint-groups
|  +--rw user-group* [name]
|  ...
|  +--rw device-group* [name]
|  ...
|  +--rw location-group* [name]
|  ...
```

【FIG. 11】

```
+--rw user-group* [name]
+--rw name                    string
+--rw (match-type)
   +--:(exact-match-ipv4)
   |  +--rw ipv4?             inet:ipv4-address
   +--:(exact-match-ipv6)
   |  +--rw ipv6?             inet:ipv6-address
   +--:(range-match-ipv4)
   |  +--rw range-ipv4-address
   |     +--rw start-ipv4-address   inet:ipv4-address
   |     +--rw end-ipv4-address     inet:ipv4-address
   +--:(range-match-ipv6)
      +--rw range-ipv6-address*
         +--rw start-ipv6-address   inet:ipv6-address
         +--rw end-ipv6-address     inet:ipv6-address
```

【FIG. 12】

```
+--rw device-group* [name]
   +--rw name                          string
   +--rw (match-type)
   |  +--:(exact-match-ipv4)
   |  |  +--rw ipv4?              inet:ipv4-address
   |  +--:(exact-match-ipv6)
   |  |  +--rw ipv6?              inet:ipv6-address
   |  +--:(range-match-ipv4)
   |  |  +--rw range-ipv4-address*
   |  |     +--rw start-ipv4-address    inet:ipv4-address
   |  |     +--rw end-ipv4-address      inet:ipv4-address
   |  +--:(range-match-ipv6)
   |     +--rw range-ipv6-address*
   |        +--rw start-ipv6-address    inet:ipv6-address
   |        +--rw end-ipv6-address      inet:ipv6-address
   +--rw protocol                      identityref
```

【FIG. 13】

```
+--rw location-group* [name]
   +--rw name           string
   +--rw geo-ip-ipv4    inet:ipv4-address
   +--rw geo-ip-ipv6    inet:ipv6-address
   +--rw continent?     identityref
```

【FIG. 14】

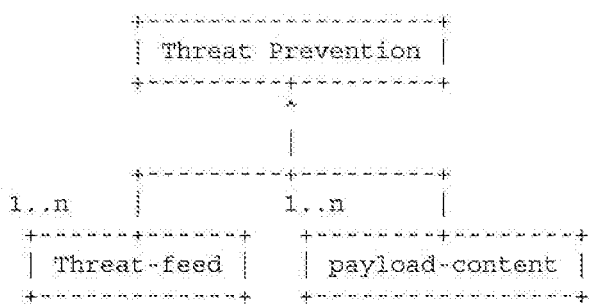

【FIG. 15】

```
+--rw threat-prevention
   +--rw threat-feed-list* [name]
      ...
   +--rw payload-content* [name]
      ...
```

【FIG. 16】

```
+--rw threat-prevention
   +--rw threat-feed-list* [name]
      +--rw name                identityref
      +--rw server-ipv4?        inet:ipv4-address
      +--rw server-ipv6?        inet:ipv6-address
      +--rw description?        string
      +--rw threat-file-types*  identityref
      +--rw signatures*         identityref
```

【FIG. 17】

```
+--rw payload-content* [name]
   +--rw name         string
   +--rw description  string
   +--rw content*     string
```

[FIG. 18]

```
list rule {
  key "name";
  ordered-by user;
  leaf name {
    type string {
      length "1..max";
    }
    description
      "Arbitrary name assigned to the rule.";
  } leaf module-name {
    type union {
      type matchall-string-type;
      type string;
    }
    default "*";
    description
      "Name of the module associated with this rule."
  } leaf access-operations {
    type union {
      type matchall-string-type;
      type access-operations-type;
    }
    default "*";
    description
      "Access operations associated with this rule."
  } leaf action {
    type action-type;
    mandatory true;
    description
      "The access control action associated with the
      rule.  If a rule is determined to match a
      particular request, then this object is used
      to determine whether to permit or deny the
      request.";
  }
```

[FIG. 19a]

```
<CODE BEGINS> file "ietf-i2nsf-cfi-policy@2020-07-13.yang"
module ietf-i2nsf-cfi-policy {
  yang-version 1.1;
  namespace
    "urn:ietf:params:xml:ns:yang:ietf-i2nsf-cfi-policy";
  prefix
    i2nsf-cfi;

import ietf-inet-types{
    prefix inet;
  } import ietf-yang-types{
    prefix yang;
  } import ietf-netconf-acm {
    prefix nacm;
  } organization
    "IETF I2NSF (Interface to Network Security Functions)
    Working Group";
```

[FIG. 19b]

```
contact
  "WG Web: <http://tools.ietf.org/wg/i2nsf>
  WG List: <mailto:i2nsf@ietf.org>

WG Chair: Linda Dunbar
  <mailto:linda.dunbar@futurewei.com>

WG Chair: Yoav Nir
  <mailto:ynir.ietf@gmail.com>

Editor: Jaehoon Paul Jeong
  <mailto:pauljeong@skku.edu>

Editor: Chaehong Chung
  <mailto:darkhong@skku.edu>";

description
  "This module is a YANG module for Consumer-Facing Interface.
  Copyright (c) 2020 IETF Trust and the persons
  identified as authors of the code. All rights reserved.
  Redistribution and use in source and binary forms, with or
  without modification, is permitted pursuant to, and subject
  to the license terms contained in, the Simplified BSD License
  set forth in Section 4.c of the IETF Trust's Legal Provisions
  Relating to IETF Documents
  http://trustee.ietf.org/license-info).
  This version of this YANG module is part of RFC XXXX; see
  the RFC itself for full legal notices.";

revision "2020-07-13"{
  description "The latest revision";
  reference
    "draft-ietf-consumer-facing-interface-dm-08";
} identity malware-file-type {
  description
    "Base identity for malware file types.";
} identity executable-file {
  base malware-file-type;
  description
    "Identity for executable file types.";
} identity doc-file {
  base malware-file-type;
```

[FIG. 19c]

```
    description
      "Identity for Microsoft document file types.";
  } identity html-app-file {
    base malware-file-type;
    description
      "Identity for html application file types.";
  } identity javascript-file {
    base malware-file-type;
    description
      "Identity for Javascript file types.";
  } identity pdf-file {
    base malware-file-type;
    description
      "Identity for pdf file types.";
  } identity dll-file {
    base malware-file-type;
    description
      "Identity for dll file types.";
  } identity msi-file {
    base malware-file-type;
    description
      "Identity for Microsoft installer file types.";
  } identity security-event-type {
    description
      "Base identity for security event types.";
  } identity ddos {
    base security-event-type;
    description
      "Identity for DDoS event types.";
  } identity spyware {
    base security-event-type;
    description
```

[FIG. 19d]

```
    "Identity for spyware event types.";
} identity trojan {
  base security-event-type;
  description
    "Identity for Trojan infection event types.";
} identity ransomware {
  base security-event-type;
  description
    "Identity for ransomware infection event types.";
} identity i2nsf-ipsec {
  description
    "Base identity for IPsec method types.";
  reference
    "draft-ietf-i2nsf-sdn-ipsec-flow-protection-07";
} identity ipsec-ike {
  base i2nsf-ipsec;
  description
    "Identity for ipsec-ike.";
  reference
    "draft-ietf-i2nsf-sdn-ipsec-flow-protection-07";
} identity ipsec-ikeless {
  base i2nsf-ipsec;
  description
    "Identity for ipsec-ikeless.";
  reference
    "draft-ietf-i2nsf-sdn-ipsec-flow-protection-07";
} identity continent {
  description
    "Base Identity for continent types.";
} identity africa {
  base continent;
  description
    "Identity for africa.";
}
```

[FIG. 19e]

```
identity asia {
  base continent;
  description
    "Identity for asia.";
} identity europe {
  base continent;
  description
    "Identity for europe.";
} identity north-america {
  base continent;
  description
    "Identity for north-america.";
} identity south-america {
  base continent;
  description
    "Identity for south-america.";
} identity oceania {
  base continent;
  description
    "Identity for Oceania";
} identity protocol-type {
  description
    "This identity represents the protocol types.";
} identity ftp {
  base protocol-type;
  description
    "The identity for ftp protocol.";
  reference
    "RFC 959: File Transfer Protocol (FTP)";
} identity ssh {
  base protocol-type;
  description
    "The identity for ssh protocol.";
  reference
```

【FIG. 19f】

```
        "RFC 4250: The Secure Shell (SSH) Protocol";
} identity telnet {
  base protocol-type;
  description
    "The identity for telnet.";
  reference
    "RFC 854: Telnet Protocol";
} identity smtp {
  base protocol-type;
  description
    "The identity for smtp.";
  reference
    "RFC 5321: Simple Mail Transfer Protocol (SMTP)";
} identity sftp {
  base protocol-type;
  description
    "The identity for sftp.";
  reference
    "RFC 913: Simple File Transfer Protocol (SFTP)";
} identity http {
  base protocol-type;
  description
    "The identity for http.";
  reference
    "RFC 2616: Hypertext Transfer Protocol (HTTP)";
} identity https {
  base protocol-type;
  description
    "The identity for https.";
  reference
    "RFC 2818: HTTP over TLS (HTTPS)";
} identity pop3 {
  base protocol-type;
  description
    "The identity for pop3.";
  reference
```

[FIG. 19g]

```
      "RFC 1081: Post Office Protocol -Version 3 (POP3)";
} identity nat {
  base protocol-type;
  description
    "The identity for nat.";
  reference
    "RFC 1631: The IP Network Address Translator (NAT)";
} identity primary-action {
  description
    "This identity represents the primary actions, such as
    PASS, DROP, ALERT, RATE-LIMIT, and MIRROR.";
} identity pass {
  base primary-action;
  description
    "The identity for pass.";
} identity drop {
  base primary-action;
  description
    "The identity for drop.";
} identity alert {
  base primary-action;
  description
    "The identity for alert.";
} identity rate-limit {
  base primary-action;
  description
    "The identity for rate-limit.";
} identity mirror {
  base primary-action;
  description
    "The identity for mirroring.";
} identity secondary-action {
```

[FIG. 19h]

```
    description
      "This field identifies additional actions if a rule is
      matched. This could be one of 'LOG', 'SYSLOG',
      'SESSION-LOG', etc.";
  } identity log {
    base secondary-action;
    description
      "The identity for logging.";
  } identity syslog {
    base secondary-action;
    description
      "The identity for system logging.";
  } identity session-log {
    base secondary-action;
    description
      "The identity for session logging.";
  } identity signature-type {
    description
      "This represents the base identity for signature types.";
  } identity signature-yara {
    base signature-type;
    description
      "This represents the YARA signatures.";
  } identity signature-snort {
    base signature-type;
    description
      "This represents the SNORT signatures.";
  } identity signature-suricata {
    base signature-type;
    description
      "This represents the SURICATA signatures.";
  } identity threat-feed-type {
```

[FIG. 19i]

```
    description
      "This represents the base identity for threat-feed.";
} identity day {
  description
    "This represents the base for days.";
} identity monday {
  base day;
  description
    "This represents monday.";
} identity tuesday {
  base day;
  description
    "This represents tuesday.";
} identity wednesday {
  base day;
  description
    "This represents wednesday.";
} identity thursday {
  base day;
  description
    "This represents thursday.";
} identity friday {
  base day;
  description
    "This represents friday.";
} identity saturday {
  base day;
  description
    "This represents saturday.";
} identity sunday {
  base day;
  description
```

[FIG. 19j]

```
        "This represents sunday.";
}

/*
 * Typedefs
 */
typedef time{
  type string {
    pattern '\d{2}:\d{2}:\d{2}(\.\d+)?'
      + '(Z|[\+\-]\d{2}:\d{2})';
  }
  description
    "This is the format of time.";
}

/*
 * Groupings
 */ grouping ipv4-list {
  description
    "Grouping for ipv4 based ip-addresses.";
  leaf-list ipv4 {
    type inet:ipv4-address;
    description
      "This is the entry for the ipv4 ip-addresses.";
  }
} grouping ipv6-list {
  description
    "Grouping for ipv6 based ip-addresses.";
  leaf-list ipv6 {
    type inet:ipv6-address;
    description
      "This is the entry for the ipv6 ip-addresses.";
  }
} grouping ipv4 {
  description
    "Grouping for ipv4 based ip-address.";
  leaf ipv4 {
    type inet:ipv4-address;
    description
      "This is the entry for the ipv4 ip-address.";
  }
```

[FIG. 19k]

```
      }
    grouping ipv6 {
      description
        "Grouping for ipv6 based ip-address.";
      leaf ipv6 {
        type inet:ipv6-address;
        description
          "This is the entry for the ipv6 ip-address.";
      }
    } grouping ip-address-info {
      description
        "There are two types to configure a security policy
        for IPv4 address, such as exact match and range match.";
      choice match-type {
        description
          "User can choose between 'exact match' and 'range match'.";
        case exact-match-ipv4 {
          uses ipv4;
          description
            "Exact ip-address match for ipv4 type addresses";
        }
        case exact-match-ipv6 {
          uses ipv6;
          description
            "Exact ip-address match for ipv6 type addresses";
        }
        case range-match-ipv4 {
          container range-ipv4-address {
            leaf start-ipv4-address {
              type inet:ipv4-address;
              description
                "Start IPv4 address for a range match.";
            }
            leaf end-ipv4-address {
              type inet:ipv4-address;
              description
                "End IPv4 address for a range match.";
            }
            description
              "Range match for an IP-address.";
          }
        }
        case range-match-ipv6 {
          container range-ipv6-address {
            leaf start-ipv6-address {
```

[FIG. 191]

```
          type inet:ipv6-address;
          description
            "Start IPv6 address for a range match.";
        }
        leaf end-ipv6-address {
          type inet:ipv6-address;
          description
            "End IPv6 address for a range match.";
        }
        description
          "Range match for an IP-address.";
      }
    }
  }
} grouping ipsec-based-method {
  description
    "This represents the ipsec-based method.";
  list ipsec-method {
    key "method";
    description
      "This represents the list of IPsec method types.";
    leaf method {
      type identityref {
        base i2nsf-ipsec;
      }
      description
        "This represents IPsec IKE and IPsec IKEless cases.
        If this is not set, it cannot support IPsec IKE or
        IPsec IKEless.";
      reference
        "draft-ietf-i2nsf-sdn-ipsec-flow-protection-07";
    }
  }
} grouping user-group {
  description
    "The grouping for user-group entities, and contains
    information such as name & ip-address.";
  leaf name {
    type string;
    description
      "This represents the name of a user-group.
      A user-group name is used to map a user-group's
      name (e.g., employees) to an ip address.
      It is implementation dependent";
```

[FIG. 19m]

```
    }
    uses ip-address-info{
      refine match-type{
        mandatory true;
      }
      description
        "This represent the IP address of a user-group.";
    }
  } grouping device-group {
    description
      "This group represents device group information
      such as ip-address protocol.";
    leaf name {
      type string;
      description
        "This represents the name of a device-group.";
    }
    uses ip-address-info{
      refine match-type{
        mandatory true;
      }
    }
    leaf-list protocol {
      type identityref {
        base protocol-type;
      }
      description
        "This represents the communication protocols of
        devices.
        If this is not set, it cannot support the
        appropriate protocol";
    }
  } grouping location-group {
    description
      "This group represents location-group information
      such as geo-ip and continent.";
    leaf name {
      type string;
      description
        "This represents the name of a location.";
    }
    list geo-ip-ipv4 {
      key "ipv4-address";
      description
```

[FIG. 19n]

```
          "This represents the list of IPv4 address based on
          a location.";
        leaf ipv4-address{
          type inet:ipv4-address;
          description
            "This represents an IPv4 geo-ip of a location.";
        }
        leaf ipv4-prefix{
          type inet:ipv4-prefix;
          description
            "This represents the prefix for the IPv4-address.";
        }
      }
      list geo-ip-ipv6 {
        key "ipv6-address";
        description
          "This represents the list of IPv6 address based on
          a location.";
        leaf ipv6-address{
          type inet:ipv6-address;
          description
            "This represents an IPv6 geo-ip of a location.";
        }
        leaf ipv6-prefix{
          type inet:ipv6-prefix;
          description
            "This represents the prefix for the IPv6-address.";
        }
      }
      leaf continent {
        type identityref {
          base continent;
        }
        default asia;
        description
          "location-group-based on geo-ip of
          respective continent.";
      }
    } grouping threat-feed-info {
      description
        "This is the grouping for the threat-feed-list";
      leaf threat-type {
        type identityref {
          base threat-feed-type;
        }
        description
```

[FIG. 19o]

```
        "This represents the type of the threat-feed.";
    }
    leaf server-ipv4 {
      type inet:ipv4-address;
      description
        "The IPv4 ip-address for the threat-feed server.";
    }
    leaf server-ipv6 {
      type inet:ipv6-address;
      description
        "The IPv6 ip-address for the threat-feed server.";
    }
    leaf description {
      type string;
      description
        "This represents the descriptions of a threat-feed.
         The description should include information, such as
         the type, related threat, method, and file type.
         Structured Threat Information Expression (STIX) can
         be used for description of a threat [STIX].";
    }
  } grouping payload-string {
    description
      "The grouping for payload-string content.
       It contains information such as name and string
       content.";
    leaf description {
      type string;
      description
        "This represents the description of a payload.
         If this is not set, it cannot support the
         description of how the payload content is
         related to a security attack.";
    }
    leaf-list content {
      type string;
      description
        "This represents the string of the payload
         contents. This content leaf-list contains the
         payload of a packet to analyze a threat.
         Due to the types of threats, the type of the
         content is defined as string to accommodate
         any kind of a payload type such as HTTP, HTTPS,
         and SIP.
         If this is not set, it cannot support the
         payload contents involved in a security attack
```

[FIG. 19p]

```
        as strings";
    }
  } list i2nsf-cfi-policy {
    key "policy-name";
    description
      "This is the security policy list. Each policy in
      the list contains a list of security rules, and is
      a policy instance to have complete information
      such as where and when a policy needs to be
      applied.";
    leaf policy-name {
      type string;
      description
        "The name which identifies the policy.";    }
    container rules{
      description
        "This container is for rules.";
      nacm:default-deny-write;
      list rule {
        key "rule-name";
        ordered-by user;
        leaf rule-name {
          type string;
          description
            "This represents the name for the rule.";
        }
        description
          "There can be a single or multiple number of
          rules.";

container event {
          description
            "This represents the event (e.g., a security
            event, for which a security rule is made.)";
          leaf security-event {
            type identityref {
              base security-event-type;
            }
            description
              "This contains the description of security
              events. If this is not set, it cannot
              support which security event is enforced";
          } container time-information {
            description
```

[FIG. 19q]

```
        "The time information when the security
        rule should be applied.";
     leaf start-date-time {
       type yang:date-and-time;
       description
          "This is the start date and time
          for policy.";
     }
     leaf end-date-time {
       type yang:date-and-time;
       description
          "This is the end date and time
          for policy. The policy will stop
          working after the specified
          end-date-time";
     }
     container period{
       when
          "/i2nsf-cfi-policy/rules/rule/event/frequency!='only-once'";
       description
          "This represents the repetition time.
          In case of frequency is weekly, the days
          can be set.";
       leaf start-time {
         type time;
         description
            "This is period start time for event.";
       }
       leaf end-time {
         type time;
         description
            "This is period end time for event.";
       }
       leaf-list day {
         when
            "/i2nsf-cfi-policy/rules/rule/event/frequency='weekly'";
         type identityref{
           base day;
         }
         description
            "This represents the repeated day of
            every week (e.g., monday and tuesday).
            More than one day can be specified";
       }
       leaf-list date {
         when
            "/i2nsf-cfi-policy/rules/rule/event/frequency='monthly'";
         type int32{
```

[FIG. 19r]

```
            range "1..31";
          }
          description
            "This represents the repeated date of
            every month. More than one date can be
            specified.";
        }
        leaf-list month {
          when
            "/i2nsf-cfi-policy/rules/rule/event/frequency='yearly'";
          type string{
            pattern '\d{2}-\d{2}';
          }
          description
            "This represents the repeated date and month
            of every year. More than one can be specified.
            Pattern used is Month-Date (MM-DD).";
        }
      }
    } leaf frequency {
      type enumeration {
        enum only-once {
          description
            "This represents the rule is enforced
            only once immediately and not repeated.
            The policy will continuously active from
            start time and terminated at end-time.";
        }
        enum daily {
          description
            "This represents the rule is enforced
            on a daily basis. The policy will be
            repeated daily until the end-date.";
        }
        enum weekly {
          description
            "This represents the rule is enforced
            on a weekly basis. The policy will be
            repeated weekly until the end-date. The
            repeated days can be specified.";
        }
        enum monthly {
          description
            "This represents the rule is enforced
            on a monthly basis. The policy will be
            repeated monthly until the end-date.";
```

[FIG. 19s]

```
        }
        enum yearly {
          description
             "This represents the rule is enforced
             on a yearly basis. The policy will be
             repeated yearly until the end-date.";
        }
      }
      default only-once;
      description
        "This represents how frequent the rule
        should be enforced.";
    }
  } container condition {
    description
     "The conditions for general security policies.";
    container firewall-condition {
      description
        "The general firewall condition.";
      leaf source {
        type leafref {
          path
             "/i2nsf-cfi-policy/endpoint-groups/user-group/name";
        }
        description
          "This describes the paths to the source reference.";
      } leaf-list destination {
        type leafref {
          path
             "/i2nsf-cfi-policy/endpoint-groups/user-group/name";
        }
        description
           "This describes the paths to the destination
           target reference.";
      }
    } container ddos-condition {
      description
        "The condition for DDoS mitigation.";
      leaf-list source {
        type leafref {
          path
```

[FIG. 19t]

```
            "/i2nsf-cfi-policy/endpoint-groups/device-group/name";
        }
        description
          "This describes the path to the
          source target references.";
      }
      leaf-list destination {
        type leafref {
          path
            "/i2nsf-cfi-policy/endpoint-groups/device-group/name";
        }
        description
          "This describes the path to the destination target
          references.";
      }
      container rate-limit {
        description
          "This describes the rate-limit.";
        leaf packet-threshold-per-second {
          type uint32;
          description
            "This is a trigger value for the condition.";
        }
      }
    } container location-condition {
      description
        "The condition for location based connection";
      leaf-list source {
        type leafref {
          path
            "/i2nsf-cfi-policy/endpoint-groups/location-group/name";
        }
        description
          "This describes the path to the location
          source reference.";
      }
      leaf-list destination {
        type leafref {
          path
            "/i2nsf-cfi-policy/endpoint-groups/location-group/name";
        }
        description
          "This describes the path to the location
          destination reference.";
      }
    }
```

[FIG. 19u]

```
        container custom-condition {
          description
            "The condition based on packet contents.";
          leaf-list source {
            type leafref {
            path
              "/i2nsf-cfi-policy/threat-preventions/payload-content/name";
            }
            description
              "Describes the payload string content condition
              source.";
          }
          leaf destination {
            type leafref {
            path
              "/i2nsf-cfi-policy/threat-preventions/payload-content/name";
            }
            description
              "Describes the payload string content condition
              destination.";
          }
        } container threat-feed-condition {
          description
            "The condition based on the threat-feed information.";
          leaf-list source {
            type leafref {
            path
              "/i2nsf-cfi-policy/threat-preventions/threat-feed-list/name";
            }
            description
              "Describes the threat-feed condition source.";
          }
          leaf destination {
            type leafref {
            path
              "/i2nsf-cfi-policy/threat-preventions/threat-feed-list/name";
            }
            description
              "Describes the threat-feed condition destination.";
          }
        }
      } container actions {
        description
          "This is the action container.";
```

[FIG. 19v]

```
            leaf primary-action {
              type identityref {
                base primary-action;
              }
              description
                "This represent the primary actions (e.g.,
                PASS, DROP, ALERT, and MIRROR) to be
                applied a condition.
                If this is not set, it cannot support
                the primary actions.";
            }
            leaf secondary-action {
              type identityref {
                base secondary-action;
              }
              description
                "This represents the secondary actions
                (e.g., log and syslog) to be applied
                if needed.
                If this is not set, it cannot support
                the secondary actions.";
            }
          } container ipsec-method {
            description
              "This container represents the IPsec IKE
              and IKEless cases.";
            leaf method {
              type identityref {
                base i2nsf-ipsec;
              }
              description
                "This references the IPsec method types,
                which includes IPsec IKE and IPsec IKEless
                cases.
                If this is not set, it cannot support
                IPsec IKE or IPsec IKEless.";
              reference
                "draft-ietf-i2nsf-sdn-ipsec-flow-protection-07";
            }
          }
        }
      }
      container endpoint-groups {
        description
          "A logical entity in their business
          environment, where a security policy
```

[FIG. 19w]

```
      is to be applied.";
    list user-group{
      uses user-group;
      key "name";
      description
        "This represents the user group.";
    }
    list device-group {
      key "name";
      uses device-group;
      description
        "This represents the device group.";
    }
    list location-group{
      key "name";
      uses location-group;
      description
        "This represents the location group.";
    }
  } container threat-preventions {
    description
      "this describes the list of threat-prevention.";
    list threat-feed-list {
      key "name";
      description
        "There can be a single or multiple number of
        threat-feeds.";
      leaf name {
        type string;
        description
          "This represents the name of the threat-feed.";
      }
      uses threat-feed-info;
      leaf-list threat-file-types {
        type identityref {
          base malware-file-type;
        }
        default executable-file;
        description
          "This contains a list of file types needed to
          be scanned for the virus.";
      }
      leaf-list signatures {
        type identityref {
          base signature-type;
        }
```

[FIG. 19x]

```
      default signature-suricata;
      description
        "This contains a list of signatures or hashes
        of the threats.";
    }
  }
  list payload-content {
    key "name";
    leaf name {
      type string;
      description
        "This represents the name of payload-content.
        It should give an idea of why specific payload
        content is marked as threat. For example, the
        name 'backdoor' indicates the payload content
        is related to backdoor attack.";
    }
    description
      "This represents the payload-string group.";
    uses payload-string;
    }
   }
  }
}
<CODE ENDS>
```

[FIG. 20]

```xml
<?xml version="1.0" encoding="UTF-8" ?>
<i2nsf-cfi-policy xmlns="urn:ietf:params:xml:ns:yang:ietf-i2nsf-cfi-policy">
  <endpoint-groups>
    <user-group>
      <name>employees</name>
      <range-ipv4-address>
        <start-ipv4-address>221.159.112.1</start-ipv4-address>
        <end-ipv4-address>221.159.112.90</end-ipv4-address>
      </range-ipv4-address>
    </user-group>
    <device-group>
      <name>webservers</name>
      <range-ipv4-address>
        <start-ipv4-address>221.159.112.91</start-ipv4-address>
        <end-ipv4-address>221.159.112.97</end-ipv4-address>
      </range-ipv4-address>
      <protocol>http</protocol>
      <protocol>https</protocol>
    </device-group>
  </endpoint-groups>
</i2nsf-cfi-policy>
```

[FIG. 21]

```xml
<?xml version="1.0" encoding="UTF-8" ?>
<i2nsf-cfi-policy xmlns="urn:ietf:params:xml:ns:yang:ietf-i2nsf-cfi-policy">
  <policy-name>security_policy_for_blocking_sns123</policy-name>
  <rules>
    <rule>
      <rule-name>block_access_to_sns_during_office_hours</rule-name>
      <event>
        <time-information>
          <start-date-time>2020-03-11T09:00:00.00Z</start-date-time>
          <end-date-time>2020-12-31T18:00:00.00Z</end-date-time>
          <period>
            <start-time>09:00:00Z</start-time>
            <end-time>18:00:00Z</end-time>
            <day>monday</day>
            <day>tuesday</day>
            <day>wednesday</day>
            <day>thursday</day>
            <day>friday</day>
          </period>
        </time-information>
        <frequency>weekly</frequency>
      </event>
      <condition>
        <firewall-condition>
          <source>employees</source>
        </firewall-condition>
      </condition>
      <actions>
        <primary-action>drop</primary-action>
      </actions>
    </rule>
  </rules>
</i2nsf-cfi-policy>
```

[FIG. 22]

```xml
<?xml version="1.0" encoding="UTF-8" ?>
<i2nsf-cfi-policy xmlns="urn:ietf:params:xml:ns:yang:ietf-i2nsf-cfi-policy">
  <policy-name>
      security_policy_for_blocking_malicious_voip_packets
      </policy-name>
  <rules>
    <rule>
      <rule-name>Block_malicious_voip_and_volte_packets</rule-name>
      <conditions>
        <custom-condition>
          <source>malicious-id</source>
        </custom-condition>
        <firewall-condition>
          <destination>employees</destination>
        </firewall-condition>
      </conditions>
      <actions>
        <primary-action>drop</primary-action>
      </actions>
      <ipsec-method>
        <method>ipsec-ikeless</method>
      </ipsec-method>
    </rule>
  </rules>
</i2nsf-cfi-policy>
```

[FIG. 23]

```xml
<?xml version="1.0" encoding="UTF-8" ?>
<i2nsf-cfi-policy xmlns="urn:ietf:params:xml:ns:yang:ietf-i2nsf-cfi-policy">
  <policy-name>security_policy_for_ddos_attacks</policy-name>
  <rules>
    <rule>
      <rule-name>100_packets_per_second</rule-name>
      <conditions>
        <ddos-condition>
          <destination>webservers</destination>
          <rate-limit>
            <packet-threshold-per-second>100</packet-threshold-per-second>
          </rate-limit>
        </ddos-condition>
      </conditions>
      <actions>
        <primary-action>drop</primary-action>
      </actions>
      <ipsec-method>
        <method>ipsec-ikeless</method>
      </ipsec-method>
    </rule>
  </rules>
</i2nsf-cfi-policy>
```

[FIG. 24]

```xml
<?xml version="1.0" encoding="UTF-8" ?>
<nacm xmlns="urn:ietf:params:xml:ns:yang:ietf-netconf-acm">
  <enable-nacm>true</enable-nacm>
  <groups>
    <group>
      <name>Example-Group</name>
      <user-name>Alice</user-name>
      <user-name>Bob</user-name>
      <user-name>Eve</user-name>
    </group>
  </groups>
  <rule-list>
    <name>Example-Group-Rules</name>
    <group>Example-Group</group>
    <rule>
      <name>Example-Group-Rule1</name>
      <access-operations>read</access-operations>
      <module-name>ietf-i2nsf-cfi-policy</module-name>
      <action>permit</action>
    </rule>
    <rule>
      <name>Example-Group-Rule2</name>
      <access-operations>create update delete</access-operations>
      <module-name>ietf-i2nsf-cfi-policy</module-name>
      <action>deny</action>
    </rule>
  </rule-list>
</nacm>
```

[FIG. 25]
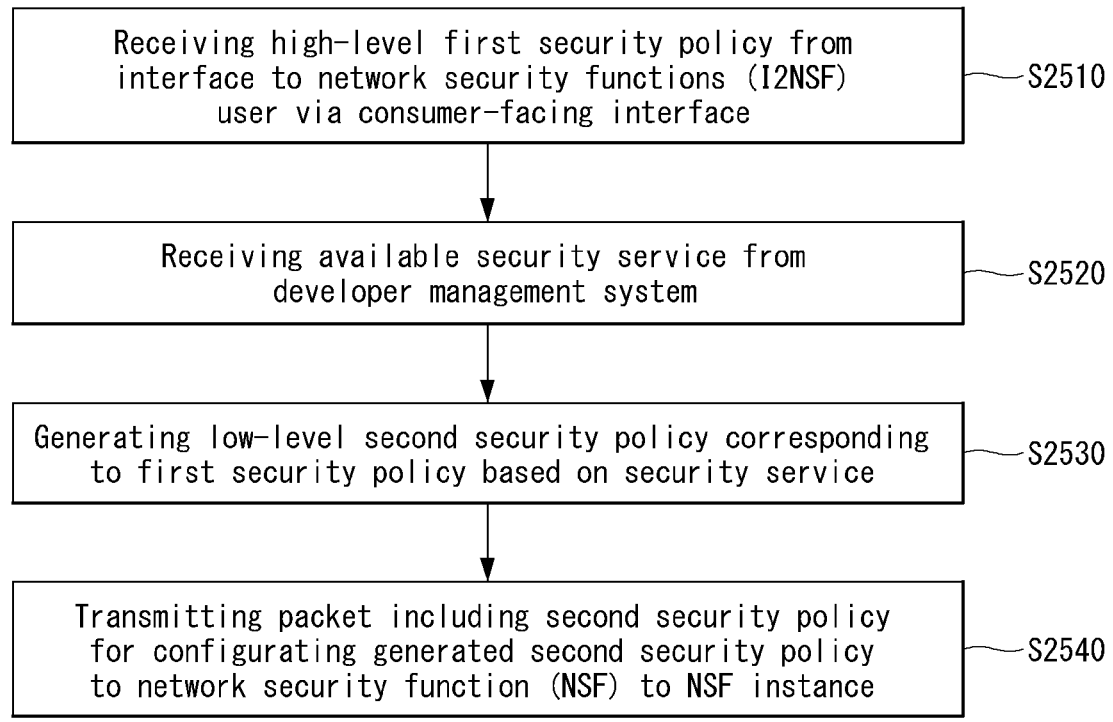

I2NSF CONSUMER-FACING INTERFACE YANG DATA MODEL

CROSS-REFERENCE TO RELATED APPLICATION

This application is based on and claims priority under 35 U.S.C. 119 to Korean Patent Application No. 10-2019-0089890, filed on Jul. 24, 2019, No. 10-2019-0139816, filed on Nov. 4, 2019, No. 10-2020-0029292, filed on Mar. 9, 2020, and No. 10-2020-0086232, filed on Jul. 13, 2020, the contents of which are all hereby incorporated by reference herein in their entirety.

BACKGROUND OF THE INVENTION

Field of the Invention

The present disclosure relates to an information model and a YANG data model for the Consumer-Facing Interface between an Interface to Network Security Functions (I2NSF) User and Security Controller in an I2NSF system in a Network Functions Virtualization (NFV) environment.

Description of the Related Art

When a network is connected to the whole world, it is possible to quickly access information regardless of geometrical distance. The internet is fundamentally composed of a large number of networks in which hierarchies of different levels are connected to each other.

The internet is operated in accordance with TCP/IP (transmission control protocol/internet protocol) published by IETF (Internet Engineering Task Force), and the TCP/IP can be found from RFC (Request For Comments) 703 and RFC 791 issued by IETF.

SUMMARY OF THE INVENTION

An object of the present disclosure is to provide a method for designing an information model and a YANG data model for consumer-facing interface between interface to network security functions users and security controllers in an interface to network security functions (I2NSF) system.

Technical objects to be achieved by the present disclosure are not limited to the aforementioned technical objects, and other technical objects not described above may be evidently understood by a person having ordinary skill in the art to which the present disclosure pertains from the following description.

An aspect of the present disclosure, in a method for providing a security service by a security controller in a security management system, includes receiving a high-level first security policy from an interface to network security functions (I2NSF) user via a consumer-facing interface; receiving an available security service from a developer management system; generating a low-level second security policy corresponding to the first security policy based on the security service; and transmitting a packet including the second security policy for configurating the generated second security policy to a network security function (NSF) to an NSF instance, wherein the first security policy may include a name of the first security policy, a rule to be applied by the I2NSF user, an endpoint group, and information for threat prevention.

In addition, the rule may include an event object for scheduling the rule, a condition object for traffic checking, and an action object indicating an action intended to be performed.

In addition, the condition object may include (1) a first condition for setting up a firewall, (2) a second condition for mitigating Ddos attacks, (3) a third condition according to user definition, and (4) a fourth condition based on a feedback threat-related report.

In addition, the action object may include a primary action and a secondary action performed after the primary action is performed, and the secondary action may be for generating a log record.

In addition, the endpoint group may include a user group related to the I2NSF user, a device group related to the security management system, and a location group related to a location of the security management system.

In addition, the first security policy may further include (1) a control group including one or more members of the user group subject to access rights to the consumer-facing interface and (2) a rule-list for granting access rights to the consumer-facing interface.

In addition, the rule-list may include a rule name, information of an access operation, information of a module related to the access operation, and information of the access rights.

In addition, the access operation may instruct reading, creating, updating or deleting of the module.

In addition, the access right may instruct whether to permit or deny the access operation.

Another aspect of the present disclosure, in a security controller for providing a security service in a security management system, includes a transceiver; a memory; and a processor configured to functionally control the transceiver and the memory, wherein the processor is configured to receive a high-level first security policy from an interface to network security functions (I2NSF) user via a consumer-facing interface via the transceiver; receive an available security service from a developer management system; generate a low-level second security policy corresponding to the first security policy based on the security service; and transmit a packet including the second security policy for configurating the generated second security policy to a network security function (NSF) to an NSF instance via the transceiver, wherein the first security policy may include a name of the first security policy, a rule to be applied by the I2NSF user, an endpoint group, and information for threat prevention.

Through the present disclosure, it can be designed that an information model for users of Interface to Network Security Functions and consumer-facing interface between security controllers in an Interface to Network Security Functions (I2NSF) system and a YANG data model.

The effects obtained in the present disclosure are not limited to the above-mentioned effects, and other effects not mentioned will be clearly understood by those skilled in the art to which the present disclosure pertains from the following description.

BRIEF DESCRIPTION OF THE DRAWINGS

FIG. 1 shows an I2NSF (Interface to Network Security Functions) system according to an embodiment of the present disclosure.

FIG. 2 exemplifies an architecture of the I2NSF system according to an embodiment of the present disclosure.

FIG. 3 shows a high-level abstraction of Consumer-Facing Interface to which the present disclosure can be applied.

FIG. 4 shows the YANG tree of the Policy object to which the present disclosure can be applied.

FIG. 5 shows the YANG data tree of the Rule object.

FIG. 6 shows the YANG tree of the Event object.

FIG. 7 shows the YANG tree of the Condition object.

FIG. 8 shows the YANG tree of the Action object.

FIG. 9 shows a number of managed objects that make up the endpoint group of the policy.

FIG. 10 shows the YANG tree of the Endpoint-Groups object.

FIG. 11 shows the YANG tree of the User-group object.

FIG. 12 shows the YANG tree of the Device-group object.

FIG. 13 shows the YANG tree of the Location-Group object.

FIG. 14 shows an example of a Threat-Prevention object and relationship.

FIG. 15 shows the YANG tree of a Threat-Prevention object.

FIG. 16 shows the YANG tree of a Threat-feed-list.

FIG. 17 shows the YANG tree of a Payload-content list.

FIG. 18 shows part of the NACM module to enable the access control of a user group for the I2NSF Consumer-Facing Interface.

FIGS. 19a to 19x shows a YANG data model for Consumer-Facing Interface, based on the information model of Consumer-Facing Interface to Security Controller.

FIG. 20 shows an example XML representation of the registered information for the user-group and device-group.

FIG. 21 shows The XML instance for Block SNS Access during Business Hours.

FIG. 22 shows The XML instance for Block Malicious VoIP/VoLTE Packets Coming to a Company.

FIG. 23 shows The XML instance for Mitigate HTTP and HTTPS Flood Attacks on a Company Web Server.

FIG. 24 shows an XML example the access control of a user group for I2NSF Consumer-Facing Interface.

FIG. 25 is an embodiment to which the present disclosure can be applied.

Accompanying drawings included as a part of the detailed description for helping understand the present disclosure provide embodiments of the present disclosure and are provided to describe technical features of the present disclosure with the detailed description.

DETAILED DESCRIPTION OF THE EMBODIMENTS

Hereinafter, preferred embodiments of the present disclosure will be described in detail with reference to the accompanying drawings. The detailed description that will be provided with the accompanying drawings is provided to explain exemplary embodiments of the present disclosure and is not intended to unique embodiments that can implement the present disclosure. The following detailed description includes details to help complete understand the present disclosure. However, those skilled in the art know that the present disclosure can be implemented even without the details.

In some cases, well-known structures and devices may be omitted or the important capability of each structure and device may be shown in a block diagram type to avoid making the concept of the present disclosure unclear.

Specific terms that are used in the following description are provided to help understand the present disclosure, and use of these specific terms may be changed in other ways without departing from the technical spirit of the present disclosure.

Recently, a fundamental standard interface for an NFV-based security function is developed by an NFV-based security function working group. This is a portion of the international internal standard organization called an IETF (Internet Engineering Task Force).

The object of the I2NSF is for defining a standardized interface for a heterogeneous NSF(s) (network security function) provided by several security solution vendors.

In an I2NSF architecture, without considering management of an NSF(s) in detail (management of NSF requires enforcement of a security policy), a user can define a protection policy for protecting network resources in a network system. Further, an interface standardized to an NSF(s) from several vendors can simplify setting and managing of tasks for a heterogeneous NSF(s).

FIG. 1 shows an I2NSF (Interface to Network Security Functions) system according to an embodiment of the present disclosure.

Referring to FIG. 1, an I2NSF system includes an I2NSF user, a network operator management system, a developer's management system, and/or at least one NSF (Network Security Function).

The I2NSF user communicates with the network operator management system through an I2NSF consumer-facing interface. The network operator management system communicates with an NSF(s) through an I2NSF NSF-facing interface. The developer's management system communicates with the network operator management system through an I2NSF registration interface. Hereafter, each component of an I2NSF system (I2NSF component) and each interface (I2NSF interface) are described.

I2NSF User

An I2NSF user is an I2NSF component that requests information from another I2NSF component (e.g., a network operator management system) and/or uses a service (e.g., a network security service) provided by another I2NSF component (e.g., a developer's management system). For example, the I2NSF user may be an overlay network management system, an enterprise network manager system, another network domain manager, etc.

The object that performs the functions designated to the I2NSF user component may be referred to as an I2NSF consumer. As an example of the I2NSF consumer, a video-conference network manager that needs to dynamically give a notice to an underlay network to allow, rate-limit, or reject flow on the basis of a specific field of a packet for a time span, enterprise network administrators and management systems that needs to request a vendor network to enforce a specific I2NSF policy for specific flow, and an IoT management system that transmits a request to an underlay network to block flow coinciding with a set of a specific condition may be included.

The I2NSF user can create and distribute a high-level security policy. In detail, the I2NSF user needs to use a network security service to protect a network traffic from various malicious attacks. In order to request this security service, the I2NSF user can create a high-level security policy for a security service that it desires, and can inform the network operator management system of the high-level security polity.

Meanwhile, in the process of preparing the high-level security polity, the I2NSF user has to consider the type of an NSF(s) required to implement a security service or a security policy rule configuration for each NSF(s).

Further, the I2NSF user can be notified of a security event(s) in underlying an NSF(s) by the network operator management system. By analyzing the security event(s), the I2NSF user can recognize new attacks and can update (or create) a high-level security policy for dealing with the new attacks. As described above, the I2NSF user can define, manage, and monitor a security policy.

Network Operator Management System

The network operator management system is a component that performs collection, distribution, and point for providing security, monitoring, and other actions. For example, the network operator management system may be a security controller. The network operator management system may be managed by a network security manager and may be referred to as an I2NSF management system.

One of the important functions of the network operator management system (or security controller) is to translate a high-level security policy (or policy rule) from the I2NSF user into a low-level security policy rule for a specific NSF(s). The network operator management system (or security controller) may receive a high-level security policy from the I2NSF user and determine the type of an NSF(s) required to enforce a policy requested first by the I2NSF user. Further, the network operator management system (security controller) may create a low-level security policy for each requested NSF(s) As a result, the network operator management system (or security controller) may set the created low-level security policy to each NSF(s).

Further, the network operator management system (or security controller) may monitor an NSF(s) that is being in driven in a system, and may maintain various items of information (e.g., network access information and a workload state) about each NSF(s). Further, the network operator management system (or security controller) may dynamically manage the pool of an NSF instance through dynamic life-cycle management of the NSF instance with the assistance of the developer's management system.

NSF

The NSF is a logical entity or a software component that provides a security-related service. For example, the NSF may receive a low-level security policy, and may sense and block or attenuate a malicious network traffic on the basis of the low-level security policy. Accordingly, integrity and confidentiality of a network communication stream can be secured.

Developer's Management System

The developer's management system is an I2NSF component that sends information to another I2NSF component (e.g., the I2NSF user or the network operator management system) and/or provide a service (e.g., a network security service). The developer's management system may be referred to as a vendor's management system. An object that performs a function designated to the developer's management system may be referred to as an I2NSF producer.

The developer's management system may be managed by a third-party security vendor that provides an NSF(s) to the network operator management system. Several developer's management systems of various security vendors may exist.

I2NSF Consumer-Facing Interface (briefly, Consumer-Facing Interface (CFI)

The CFI is an interface to an I2NSF system of a user, positioned between the I2NSF user and the network operator management system. By being designed in this way, only an abstract view of an NSF(s) is provided to a user with the details of an underlying NSF(s) hidden.

The CFI may be used to enable different users of an I2NSF system to define, manage, and monitor a security policy for specific flow in a management domain. A high-level security policy (policy rule) created by the I2NSF user may be transmitted to the network operator management system through the CFI I2NSF NSF-Facing Interface (briefly, NSF-Facing Interface (NFI)

The NFI is an interface positioned between the network operator management system (or security controller) and an NSF(s).

The NFI may be used to designate and monitor a flow-based security policy enforced by one or more NSFs. For example, the I2NSF system may use a flow-based NSF. In this case, the flow-based NSF is an NSF that examines network from in accordance with a set of policies to reinforce the security characteristic. Flow-based security by the flow-based NSF means that packets are examined in the received order and there is no correction for the packets in accordance with an examination process. The interface for the flow-based NSF may be classified as follows:

NSF Operational and Administrative Interface: An interface group used by the I2NSF management system to program the operation state of an NSF; this interface group also includes a management control capability. The I2NSF policy rule is one method of changing the interface group in a consistent manner. Since an application and an I2NSF component need to dynamically control the actions of traffics that they transmit and receive, most of I2NSF efforts are concentrated on the interface group.

Monitoring Interface: An interface group used by the I2NSF management system to obtain monitoring information of one or more selected NSFs; each interface of this interface group may be a query- or report-based interface. The difference between the two is that the query-based interface is used by the I2NSF management system to obtain information, but the report-based interface is used by an NSF to provide information. The capability of the interface group may also be defined by another protocol such as LOG[RFC 5424] and DOTS (Distributed Denial-of-Service Open Threat Signaling) [RFC 8782]. The I2NSF management system may take one or more actions on the basis of reception of information. This should be designated by a policy rule. The interface group does not change the operation state of an NSF.

As described above, the NFI may be developed using a flow-based paradigm. The common trait of the flow-based NSF is to process a packet on the basis of the contents (e.g., header/payload) and/or context (e.g., a session state and an authentication state) of a received packet. This trait is one of requirements for defining the action of the I2NSF system.

Meanwhile, the I2NSF system does not need to use all abilities of a given NSF and does not need to use all available NSFs. Accordingly, this abstraction enables an NSF feature to be handled in a building block by an NSF system. Therefore, a developer may freely use a security capability defined by an individual NSF for a vendor and a technology.

I2NSF Registration Interface (Briefly, Registration Interface (RI))

The RI is an interface positioned between the network operator management system and the developer's management system. NSFs provided by different vendors may have different capabilities. Accordingly, in order to automate a process that uses various types of security capabilities provided by different vendors, the vendors need to have an exclusive interface for determining the capabilities of their NSFs. These exclusive interfaces may be referred to as I2NSF registration interface (RI).

The capability of an NSF may be configured in advance or may be dynamically searched through an I2NSF registration interface. If a new capability that is exposed to a consumer is added to an NSF, in order that interested management and control entity can know that, a new capability needs to be registered on an I2NSF registry through the I2NSF registration interface.

FIG. 2 exemplifies an architecture of the I2NSF system according to an embodiment of the present disclosure. The I2NSF system of FIG. 2 shows in more detail the configuration of an I2NSF user and a network operator management system in comparison to the I2NSF system of FIG. 1. In FIG. 2, description overlapping the detailed description of FIG. 1 is omitted.

Referring to FIG. 2, an I2NSF system includes an I2NSF user, a security management system, and an NSF instance hierarchy. An I2NSF user hierarchy includes an application logic, a policy updater, and an event collector as components. A security management system hierarchy includes a security controller and a developer's management system. The security controller of the security management system hierarchy includes a security policy manager and an NSF capability manager as components.

The I2NSF user hierarchy communicates with the security management system hierarchy through a consumer-facing interface. For example, the policy updater and the event collector of the I2NSF user hierarchy communicates with the security controller of the security management system hierarchy through a consumer-facing interface. Further, the security management system hierarchy communicates with an NSF instance hierarchy through an NSF-facing interface. For example, the security controller of the security management system hierarchy communicates with an NSF instance(s) of the NSF instance hierarchy through the NSF-facing interface. Further, the developer's management system of the security management system hierarchy communicates with the security controller of the security management system hierarchy through a registration interface.

The I2NSF user hierarchy, the security controller component of the security management system hierarchy, the developer's management system component of the security management system hierarchy, and the NSF instance hierarchy of FIG. 2 respectively correspond to the I2NSF user hierarchy, the network operator management system component, the developer's management system component, and the NSF component of FIG. 1. Further, the consumer-facing interface, the NSF-facing interface, and the registration interface of FIG. 2 correspond to the consumer-facing interface, the NSF-facing interface, and the registration interface of FIG. 1. Hereafter, newly defined components included in each hierarchy are described.

I2NSF User

As described above, an I2NSF user hierarchy includes the following three components: an application logic, a policy updater, and an event collector. The function and action of each component are as follows.

The application logic is a component that creates a high-level security policy. To this end, the application logic receives an event for updating (or creating a high-level policy from the event collector and updates (or creates) the high-level policy on the basis of the collected event. Thereafter, the high-level policy is sent to the policy updater to be distributed to the security controller. In order to update (or create) the high-level policy, the event collector receives events sent by the security collector and sends them to the application logic. On the basis of this feedback, the application logic may update (or create) the high-level security policy.

In FIG. 2, the application logic, the policy updater, and the event collector are shown as individual configurations, but the present disclosure is not limited thereto. In other words, each of them is a logic component and may be implemented as one or two components in the I2NSF system.

Security Management System

As described above, the security controller of the security management system hierarchy includes two components such as a security policy manager and an NSF capability manager.

The security policy manager may receives a high-level policy from the policy updater through the CFI and may map the policy to a low-level policy. The low-level policy is related to a given NSF capability registered in an NSF capability manager. Further, the security policy manager may transmit the policy to an NSF(s) through the NFI.

The NSF capability manager may designate the capability of an NSF registered by the developer's management system and share the capability with the security policy manager to create a low-level policy related to a given NSF capability. Every time a new NSF is registered, the NSF capability manager may request the developer's management system to register the capability of the NSF in a management table of the NSF capability manager through the registration interface. The developer's management system correspond to another part of the security management system fro registering the capability of a new NSF to the NSF capability manager.

In FIG. 2, the security policy manager and the NSF capability manager are shown as individual configurations, but the present disclosure is not limited thereto. In other words, each of them is a logic component and may be implemented as one component in the I2NSF system.

NSF Instances

As shown in FIG. 2, the NSF instance hierarchy includes NSFs. In this case, all the NSFs are positioned in the NSF instance hierarchy. Meanwhile, a high-level policy is mapped to a low-level policy and then the security policy manager transmits the policy to the NSF(s) through the NFI. In this case, the NSF may sense and block or attenuate a malicious network traffic on the basis of the received low-level security policy.

For quick development of a virtualization system, a high-class security capability is required in various scenarios (e.g., the network device of an enterprise network, the user equipment of a mobile network, a device of the internet, or a resident access user).

NSFs produced by several security companies may provide various security capabilities to customers. That is, regardless of whether NSF are implemented by a physical or virtual capability, several NSF may provide a security service for a given network traffic by being combined with each other.

A security capability means a capability related to security of a series of networks that can be used for enforcing a security policy. The security capability is independent from an actually implemented security control mechanism and a set of capabilities that can be provided by NSFs is registered in all NSFs.

The security capability is a market leader providing a method that can define customized security protection by clearly explaining the security capability provided by a specific NSF. Further, the company supplying the security capability may be explained in a neutral manner through the security capability.

That is, it is not required to state a specific product and a feature may be considered for each capability when designing a network.

As described above, as the I2NSF interface that can be used for providing a security policy, two types may exist as follows.

An interface and a security controller between an I2NSF user and an application program (Consumer-Facing Interface): Service-directional interface providing NSF data and a communication channel between a service user and a network operator management system (or security controller).

The I2NSF Consumer-Facing Interface enables security information to be used for exchange between various applications (e.g., OpenStack or various BSS/OSS components) and a security controller. The design target of the Consumer-Facing Interface is to implement and separate specs of a security service.

An interface (e.g., a firewall, anti-invasion or anti-virus) and a security controller between NSFs (NSF-Facing interface): The NSF-Facing Interface is used to separate a security management system from an NSF set and several implements and is independent in the manner in which an NSF is implemented (e.g., a virtual machine or actual appliances).

Hereafter, an object-directional information model about network security, contents security, and an attach attenuation capability is described with related I2NSF policy objects.

In the present disclosure, terms used in an information module may be defined as follows.

AAA: Access control, Authorization, Authentication
ACL: Access Control List
(D)DoD: (Distributed) Denial of Service (attack)
ECA: Event-Condition-Action
FMR: First Matching Rule (resolution strategy)
FW: Firewall
GNSF: Generic Network Security Function
HTTP: HyperText Transfer Protocol
I2NSF: Interface to Network Security Functions
IPS: Intrusion Prevention System
LMR: Last Matching Rule (resolution strategy)
MIME: Multipurpose Internet Mail Extensions
NAT: Network Address Translation
NSF: Network Security Function
RPC: Remote Procedure Call
SMA: String Matching Algorithm
URL: Uniform Resource Locator
VPN: Virtual Private Network The information model defines various types of managed objects and the relationship among them needed to build the interface. The information model is organized based on the "Event-Condition-Action" (ECA) policy model defined by a capability information model for I2NSF [i2nsf-capability-im], and the data model is defined for enabling different users of a given I2NSF system to define, manage, and monitor security policies for specific flows within an administrative domain.

Information Model Design

The start point of designing of a capability information model is to classify the types of security capabilities. For example, it is to classify the types of security types such as "IPS", "antivirus", and "VPN concentration apparatus".

Alternatively, a "packet filter" may be classified into a storage device that can allow for or reject packet transmission in accordance with various conditions (e.g., transmission and reception IP addresses, transmission and reception ports, and an IP protocol type field).

However, other devices such as a state-based firewall or an application program layer filter require more information. These devices filter a packet or communication, but are different in the state that categorizes and maintains packets and communications.

Analog consideration points may be considered in channel protection protocols. The channel protection protocols may protect a packet through a symmetric algorithm that can be negotiated into an asymmetric password, may operate in different layers, and may support different algorithms and protocols.

For safe protection, perfection, selective secrecy, anti-reply protection, and peer authentication should be applied to these protocols.

Capability Information Model Overview

A capability information model defines a security capability model providing a base for automatic management of an NSF. The capability information module includes allowing a security controller to appropriately recognize and manage an NSF and appropriately declare such that an NSF can use capabilities in a correct way.

Some basic rules for security and a system that has to manage the basic rules are as follows.

Independence: Each security capability should be capability that has minimum overlap or dependence to another capability. Accordingly, the security capabilities can be freely used and combined. It is more important that a change to one capability does not influence another capability.

This follows Single Responsibility Principle [Martin] [OODSRP].

Abstraction: Each capability should be defined in an vendor-independent manner and should provide a standardized capability that is connected with a well-known interface and can describe and report a processing result. Accordingly, mutual operability with multiple vendors can be improved.

Automation: A system should be able to automatically search, automatically negotiate, and automatically update a security capability (i.e., without intervention of a user). This automation capability is particularly useful for managing several NSFs.

It is necessary to add a smart service (e.g., analysis, refinement, capability inference, and optimization) to a selected security system. This capability is supported in main design patterns such as Observer Pattern [OODOP], Mediator Pattern [OODMP], and Message Exchange Patterns [Hohpe].

Extendibility: A management system should have a scale up/down or scale in/out capability. Accordingly, due to this extendibility, it is possible to satisfy various performance requirements derived from a variable network traffic or service request. Further, a security capability that is influenced by extendibility may help to determine whether to call out a scaling only when supporting a report statistics to a security controller.

Abstraction having a standard interface and a vender neutral capability set may be defined in accordance with the basic rules. This provides definition such that a capability model enabling a necessary NSF set to be used within a give time and security provided by a used NSF set is not ambiguous.

The security controller selects an NSF required to satisfy corresponding requirements by comparing requirements of a user and an application program with a currently available capability set.

Further, when an unknown threat (e.g., zero-day exploits and unknown malware) is reported by an NSF, a new capability may be created and/or the existing capability may be updated (e.g., by updating its signature and algorithm). As a result, the existing NSF is reinforced (and/or a new NSF is created) to cope with a new threat.

The new capability may be transmitted and stored in a central repository or may be individually stored in a local repository of a vendor. In both cases, a standard interface enables an update process to be easily performed.

ECA Policy Model Overview

An "Event-Condition-Action"(ECA) policy model is used as a base for design of an I2NSF policy rule. IN this case, terms related to the I2NSF policy may be defined as follows (see ([I-D.draft-ietf-i2nsf-terminology]).

Event: An event occurs at an important point when a system that is managed is changed or in time in the environment of a system that is managed. An event may be used to determine whether it is possible to evaluate a condition clause of the I2NSF when being used in a context of the I2NSF policy rule. As an example of an I2NSF event, there may be a time and a user action (e.g., logon, logoff, and an action violating ACL).

Condition: A condition is defined as a set of a property, a capability, and/or a value to be compared with a set of a known property, feature, and/or value, and may execute or may not execute the (imperative)I2NSF policy rule. In an example of the I2NSF, coinciding property of a packet or flow and comparison of the internal state of an NSF with a desired state may be included.

Action: An action is used to control and monitor the side of a flow-based NSF when an event and a condition clause are satisfied. An NSF provides a security capability by executing various actions. In an example of an I2NSF work, intrusion detection and/or protection, web and flow filtering, and providing deep packet examination for a packet and flow may be included.

The I2NSF policy rule is composed of three Boolean clauses of an event clause, a condition clause, and an action clause.

The Boolean clause means a logical statement that is evaluated as TURE or FALSE and may be composed of one or more terminologies.

When there are two or more terminologies, the Boolean clause connects the terminologies using logical connectives (i.e., ANA, OR, and NOT). The logical connectives may have the meanings in the following Table 1.

TABLE 1

IF <event-clause> is TRUE
   IF <condition-clause> is TRUE
      THEN execute <action-clause>
   END-IF
END-IF Technically, a "policy rule" may actually function as a container aggregating not only metadata, but also the "event", "action" and "condition" described above.

The ECA policy model described above is very general, may be easily extended, and may avoid a latent limitation that may limit a generic security capability implementation.

Consumer-Facing Interface

In a framework of Interface to Network Security Functions (I2NSF), each vendor can register their NSFs using a Developer's Management System (DMS). Assuming that vendors also provide the front-end web applications registered with an I2NSF User, the Consumer-Facing Interface is required because the web applications developed by each vendor need to have a standard interface specifying the data types used when the I2NSF User and Security Controller communicate using this interface. Therefore, this document specifies the required information, their data types, and encoding schemes so that high-level security policies (or configuration information for security policies) can be transferred to the Security Controller through the Consumer-Facing Interface. These policies can easily be translated by the Security Controller into low-level security policies. The Security Controller delivers the translated policies to Network Security Functions (NSFs) according to their respective security capabilities for the required security enforcement.

The Consumer-Facing Interface would be built using a set of objects, with each object capturing a unique set of information from Security Administrator (i.e., I2NSF User [RFC8329]) needed to express a Security Policy. An object may have relationship with various other objects to express a complete set of requirements. An information model captures the managed objects and relationship among these objects. The information model proposed in this document is structured in accordance with the "Event-Condition-Action" (ECA) policy model.

An NSF Capability model is proposed in [i2nsf-capability-im] as the basic model for both the NSF-Facing interface and Consumer-Facing Interface security policy model of this document.

FIG. 3 shows a high-level abstraction of Consumer-Facing Interface.

Data models are defined at a lower level of abstraction and provide many details. They provide details about the implementation of a protocol's specification, e.g., rules that explain how to map managed objects onto lower-level protocol constructs. Since conceptual models can be implemented in different ways, multiple data models can be derived from a single information model.

The efficient and flexible provisioning of network functions by a Network Functions Virtualization (NFV) system leads to a rapid advance in the network industry. As practical applications, Network Security Functions (NSFs), such as firewall, Intrusion Detection System (IDS)/Intrusion Prevention System (IPS), and attack mitigation, can also be provided as Virtual Network Functions (VNF) in the NFV system. By the efficient virtualization technology, these VNFs might be automatically provisioned and dynamically migrated based on real-time security requirements. This document presents a YANG data model to implement security functions based on NFV.

Information Model for Policy

A Policy object represents a mechanism to express a Security Policy by Security Administrator (i.e., I2NSF User) using Consumer-Facing Interface toward Security Controller; the policy would be enforced on an NSF.

FIG. 4 shows the YANG tree of the Policy object.

The Policy object SHALL have the following information:

Name: This field identifies the name of this object.

Rule: This field contains a list of rules. These rules are defined for 1) communication between two Endpoint Groups, 2) for preventing communication with externally or internally identified threats, and 3) for implementing business requirement such as controlling access to internal or external resources for meeting regulatory compliance or business objectives. An organization may restrict certain communication between a set of user and applications for example. The threats may be from threat feeds obtained from external sources or dynamically identified by using specialty devices in the network. Rule conflict analysis should be triggered by the monitoring service to perform an exhaustive detection of anomalies among the configuration rules installed into the security functions.

A policy is a container of Rule(s). In order to express a Rule, a Rule must have complete information such as where and when a policy needs to be applied. This is done by defining a set of managed objects and relationship among them. A Policy Rule may be related segmentation, threat mitigation or telemetry data collection from an NSF in the network, which will be specified as the sub-model of the policy model in the subsequent sections.

FIG. 5 shows the YANG data tree of the Rule object. The rule object SHALL have the following information:

Name: This field identifies the name of this object.

Event: This field includes the information to determine whether the Rule Condition can be evaluated or not. See details in Section Event Sub-model.

Condition: This field contains all the checking conditions to apply to the objective traffic. See details in Section Condition Sub-model.

Action: This field identifies the action taken when a rule is matched. There is always an implicit action to drop traffic if no rule is matched for a traffic type. See details in Section Action Sub-model.

IPsec-Method: This field contains the information about IPsec method type. There are two types such as IPsec-IKE and IPsec-IKEless [i2nsf-ipsec].

Event Sub-Model

The Event Object contains information related to scheduling a Rule. The Rule could be activated based on a set time or security event.

FIG. 6 shows the YANG tree of the Event object. Event object may have following information:

Security-event: This field identifies for which security event the policy is enforced. The examples of security events are: "DDOS", "spyware", "trojan", and "ransomware".

Time-information: This represents the security rule is enforced based on the period information with the end time for the event.

Period: This represents the period of time the rule event is active.

End-time: This represents the end time of the event. If the rule time has pass the end-time, the rule will stop repeating.

Frequency: This represents how frequent the rule should be enforced. There are four options: "only-once", "daily", "weekly" and "monthly".

Condition Sub-Model

This object represents Conditions that Security Administrator wants to apply the checking on the traffic in order to determine whether the set of actions in the Rule can be executed or not. The Condition Sub-model consists of three different types of containers each representing different cases, such as general firewall and DDoS-mitigation cases, and a case when the condition is based on the payload strings of packets. Each containers have source and destination-target to represent the source and destination for each case.

FIG. 7 shows the YANG tree of the Condition object.

The Condition Sub-model may have following information:

Case (Firewall-condition): This field represents the general firewall case, where a security admin can set up firewall conditions using the information present in this field. The source and destination is represented as firewall-source and firewall-destination, each referring to the IP-address-based groups defined in the endpoint-groups.

Case (DDoS-condition): This field represents the condition for DDoS mitigation, where a security admin can set up DDoS mitigation conditions using the information present in this field. The source and destination is represented as ddos-source and ddos-destination, each referring to the device-groups defined and registered in the endpoint-groups.

Case (Custom-condition): This field contains the payload string information. This information is useful when security rule condition is based on the string contents of incoming or outgoing packets. The source and destination is represented as custom-source and custom-destination, each referring to the payload-groups defined and registered in the endpoint-groups.

Case (Threat-feed-condition): This field contains the information obtained from threat-feeds (e.g., Palo-Alto, or RSA-netwitness). This information is useful when security rule condition is based on the existing threat reports gathered by other sources. The source and destination is represented as threat-feed-source and threat-feed-destination. For clarity, threat-feed-source/destination represent the source/destination of a target security threat, not the information source/destination of a threat-feed.

Action Sub-Model

This object represents actions that Security Admin wants to perform based on certain traffic class.

FIG. 8 shows the YANG tree of the Action object. The Action object may have following information:

Primary-action: This field identifies the action when a rule is matched by an NSF. The action could be one of "PASS", "DROP", "ALERT", "RATE-LIMIT", and "MIRROR".

Secondary-action: This field identifies the action when a rule is matched by an NSF. The action could be one of "log", "syslog", "session-log".

Secondary-action may be performed after the primary-action.

Through additional secondary-action, a log record related to security may be generated.

Information Model for Policy Endpoint Groups

The Policy Endpoint Group is a very important part of building User-Construct based policies. A Security Administrator would create and use these objects to represent a logical entity in their business environment, where a Security Policy is to be applied. There are multiple managed objects that constitute a Policy's Endpoint Group as shown in FIG. 9. FIG. 10 shows the YANG tree of the Endpoint-Groups object. This section lists these objects and relationship among them.

(1) User Group

This object represents a User-Group. FIG. 9 shows the YANG tree of the User-Group object. The User-Group object may have the following information:

Name: This field identifies the name of this object.

IP-address: This represents the IPv4 address of a user in the user group.

range-ipv4-address: This represents the IPv4 address of a user in the user group.

range-ipv6-address: This represents the IPv6 address of a user in the user group.

(2) Device Group

This object represents a Device-Group.

FIG. 12 shows the YANG tree of the Device-group object.

The Device-Group object may have the following information:

Name: This field identifies the name of this object.

IP-address: This represents the IPv4 address of a device in the device group.

range-ipv4-address: This represents the IPv4 address of a device in the device group.

range-ipv6-address: This represents the IPv6 address of a device in the device group.

Protocol: This represents the communication protocols used by the devices. The protocols are "SSH", "FTP", "SMTP", "HTTP", "HTTPS", and etc.

(3) Location Group

This object represents a location group based on either tag or other information.

FIG. 13 shows the YANG tree of the Location-Group object. The Location-Group object may have the following information:

Name: This field identifies the name of this object.

geo-ip-ipv4: This field represents the IPv4 Geo-ip of a location.

geo-ip-ipv6: This field represents the IPv6 Geo-ip of a location.

continent: This field represents the continent where the location group member is at.

Information Model for Threat Prevention

The threat prevention plays an important part in the overall security posture by reducing the attack surfaces. This information could come from various threat feeds (i.e., sources for obtaining the threat information). There are multiple managed objects that constitute this category. This section lists these objects and relationship among them.

FIG. 14 shows an example of a Threat-Prevention object and relationship.

FIG. 15 shows the YANG tree of a Threat-Prevention object.

(1) Threat Feed

This object represents a threat feed which provides signatures of malicious activities. FIG. 16 shows the YANG tree of a Threat-feed-list. The Threat-Feed object may have the following information:

name: This field identifies the name of this object.

Server-ipv4: This represents the IPv4 server address of the feed provider, it may be external or local servers.

Server-ipv6: This represents the IPv6 server address of the feed provider, it may be external or local servers.

description: This is the description of the threat feed. The descriptions should have clear indication of the security attack such as attack type (e.g., APT) and file types used (e.g., executable malware).

Threat-file-types: This field identifies the information about the file types identified and reported by the threat-feed.

signatures: This field contains the signatures of malicious programs or activities provided by the threat-feed. The examples of signature types are "YARA", "SURICATA", and "SNORT".

(2) Payload Content

This object represents a custom list created for the purpose of defining exception to threat feeds.

FIG. 17 shows the YANG tree of a Payload-content list. The Payload-Content object may have the following information:

Name: This field identifies the name of this object. For example, the name "backdoor" indicates the payload content is related to backdoor attack.

description: This represents the description of how the payload content is related to a security attack.

Content: This contains the payload contents, which are involved in a security attack, as strings.

Network Configuration Access Control Model (NACM) for I2NSF Consumer-Facing Interface Network Configuration Access Control Model (NACM) provides a user group with an access control with the following features [RFC8341]:

Independent control of action, data, and notification access is provided.

A simple and familiar set of datastore permissions is used.

Support for YANG security tagging allows default security modes to automatically exclude sensitive data.

Separate default access modes for read, write, and execute permissions are provided.

Access control rules are applied to configurable groups of users.

The data model of the I2NSF Consumer-Facing Interface utilizes the NACM's mechanisms to manage the access control on the I2NSF Consumer-Facing Interface. The NACM with the above features can be used to set up the access control rules of a user group in the I2NSF Consumer-Facing Interface. FIG. 18 shows part of the NACM module to enable the access control of a user group for the I2NSF Consumer-Facing Interface. To use the NACM, a user needs to configure a NETCONF or RESTCONF server to enable the NACM module. Then, the user can simply use an account of root or admin user for the access control for the module of the I2NSF Consumer-Facing Interface (i.e., ietf-i2nsf-cfi-policy). An XML example to configure the access control a user group for the I2NSF Consumer-Facing Interface can be seen in Section "XML Configuration Example of a User Group's Access Control for I2NSF Consumer-Facing Interface".

YANG Data Model of Consumer-Facing Interface

The main objective of this data model is to provide both an information model and the corresponding YANG data model of I2NSF Consumer-Facing Interface. This interface can be used to deliver control and management messages between an I2NSF User and Security Controller for the I2NSF User's high-level security policies.

The semantics of the data model must be aligned with the information model of the Consumer-Facing Interface. The transformation of the information model was performed so that this YANG data model can facilitate the efficient delivery of the control or management messages.

This data model is designed to support the I2NSF framework that can be extended according to the security needs. In other words, the model design is independent of the content and meaning of specific policies as well as the implementation approach. This document suggests a VoIP/VoLTE security service as a use case for policy rule generation.

FIGS. 19a to 19x show a YANG data model for Consumer-Facing Interface, based on the information model of Consumer-Facing Interface to Security Controller.

XML Configuration Examples of High-Level Security Policy Rules

This section is informative with XML configuration examples. This section shows XML configuration examples of high-level security policy rules that are delivered from the I2NSF User to the Security Controller over the Consumer-Facing Interface. The considered use cases are: Database registration, time-based firewall for web filtering, VoIP/VoLTE security service, and DDoS-attack mitigation.

(1) Database Registration: Information of Positions and Devices (Endpoint Group)

If new endpoints are introduced to the network, it is necessary to first register their data to the database. For example, if new members are newly introduced in either of three different groups (i.e., user-group, device-group, and payload-group), each of them should be registered with information such as ip-addresses or protocols used by devices.

FIG. 20 shows an example XML representation of the registered information for the user-group and device-group.

(2) Scenario 1: Block SNS Access during Business Hours

The first example scenario is to "block SNS access during office hours" using a time-based firewall policy. In this scenario, all users registered as "employees" in the user-group list are unable to access Social Networking Services (SNS) during the office hours (ex, weekdays).

FIG. 21 shows The XML instance for Block SNS Access during Business Hours.

Time-based-condition Firewall

1. The policy name is "security_policy_for_blocking_sns".
2. The rule name is "block_access_to_sns_during_office_hours".
3. The Source is "employees".
4. The destination target is "sns-websites". "sns-websites" is the key which represents the list containing the information, such as URL, about sns-websites.
5. The action required is to "drop" any attempt to connect to websites related to Social networking.
6. The IPsec method type used for nsf traffic steering is set to "ipsec-ike".

(3) Scenario 2: Block Malicious VoIP/VoLTE Packets Coming to a Company

The second example scenario is to "block malicious VoIP/VoLTE packets coming to a company" using a VoIP policy. In this scenario, the calls comming from from VOIP and/or VOLTE sources with VOLTE IDs that are classified as malicious are dropped. The IP addresses of the employees and malicious VOIP IDs should be blocked are stored in the database or datastore of the enterprise. Here and the rest of the cases assume that the security administrators or someone responsible for the existing and newly generated policies, are not aware of which and/or how many NSFs are needed to meet the security requirements.

FIG. 22 shows The XML instance for Block Malicious VoIP/VoLTE Packets Coming to a Company.

Once a high-level security policy is created by a security admin, it is delivered by the Consumer-Facing Interface, through RESTCONF server, to the security controller.

Custom-condition Firewall

1. The policy name is "security_policy_for_blocking_malicious_voip_packets".
2. The rule name is "Block_malicious_voip_and_volte_packets".
3. The Source is "malicious-id". This can be a single ID or a list of IDs, depending on how the ID are stored in the database. The "malicious-id" is the key so that the security admin can read every stored malicious VOIP IDs that are named as "malicious-id".
4. The destination target is "employees". "employees" is the key which represents the list containing information about employees, such as IP addresses.
5. The action required is "drop" when any incoming packets are from "malicious-id".
6. The IPsec method used for nsf traffic steering is set to "ipsec-ikeless".

(4) Scenario 3: Mitigate HTTP and HTTPS Flood Attacks on a Company Web Server

The third example scenario is to "Mitigate HTTP and HTTPS flood attacks on a company web server" using a DDoS-attack mitigation policy. Here, the time information is not set because the service provided by the network should be maintained at all times. If the packets sent by any sources are more than the set threshold, then the admin can set the percentage of the packets to be dropped to safely maintain the service. In this scenario, the source is set as "any" to block any sources which send abnormal amount of packets. The destination is set as "web_server01". Once the rule is set and delivered and enforced to the nsfs by the securiy controller, the NSFs will monitor the incoming packet amounts and the destination to act according to the rule set.

FIG. 23 shows The XML instance for Mitigate HTTP and HTTPS Flood Attacks on a Company Web Server.

DDoS-condition Firewall

1. The policy name is "security_policy_for_ddos_attacks".
2. The rule name is "100_packets_per_second".
3. The destination target is "webservers". "webservers" is the key which represents the list containing information, such as IP addresses and ports, about web-servers.
4. The rate limit exists to limit the incoming amount of packets per second. In this case the rate limit is "100" packets per second. This amount depends on the packet receiving capacity of the server devices.
5. The Source is all sources which send abnormal amount of packets.
6. The action required is to "drop" packet reception is more than 100 packets per second.
7. The IPsec method used for nsf traffic steering is set to "ipsec-ike".

XML Configuration Example of a User Group's Access Control for I2NSF Consumer-Facing Interface Note: This section is informative with an XML configuration example.

This is an example for creating privileges for a group of users (i.e., a user group) to access and use the I2NSF Consumer-Facing Interface to create security policies via the interface. For the access control of the Consumer-Facing Interface, the NACM module can be used.

FIG. 24 shows an XML example the access control of a user group (named Example-Group) for I2NSF Consumer-Facing Interface.

A group called Example-Group can be created and configured with NACM for the Consumer-Facing Interface. For Example-Group, a rule list can created with the name of Example-Group-Rules. Example-Group-Rules has two rules of Example-Group-Rule1 and Example-Group-Rule2 as follows.

For Example-Group-Rule1, the privilege of "Read" is allowed to Example-Group for the Consumer-Facing Interface. On the other hand, for Example-Group-Rule2, the privileges of "Create", "Update", and "Delete" are denied against Example-Group for the Consumer-Facing Interface.

The access control for the I2NSF Consumer-Facing Interface is as follows.

1. The NACM is enabled.
2. As a group name, Example-Group is specified.
3. As members of the group, Alice, Bob, and Eve are specified.
4. As a rule list name, Example-Group-Rules is specified for managing privileges of Example-Group's members.
5. As the first rule name, Example-Group-Rule1 is specified. This rule is used to give read privilege to Example-Group's members for the module of the I2NSF Consumer-Facing Interface.
6. As the second rule name, Example-Group-Rule2 is specified. This rule is used to deny create, update, and delete privileges against Example-Group's members for the module of the I2NSF Consumer-Facing Interface.

Security Considerations

The data model for the I2NSF Consumer-Facing Interface is based on the I2NSF framework [RFC8329], so the same security considerations with the I2NSF framework should be included in this document. The data model needs a secure communication channel to protect the Consumer-Facing Interface between the I2NSF User and Security Controller. Also, the data model's management access control is based on Network Configuration Access Control Model(NACM) mechanisms [RFC8341].

FIG. 25 is an embodiment to which the present disclosure can be applied.

Referring to FIG. 25, a security controller (security controller) may be connected to an I2NSF user through an I2NSF consumer-facing interface.

The security controller receives a high-level first security policy from the interface to network security functions (I2NSF) user via a consumer-facing interface (S2510).

The security controller receives an available security service from a developer management system (S2520).

The security controller generates a low-level second security policy corresponding to the first security policy based on the available security service (S2530).

The security controller transmits a packet including the second security policy for configurating the second security policy to an NSF to an NSF instance (S2540).

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. Order of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The present disclosure may be applied to various security management systems.

What is claimed is:

1. A method for providing a security service by a security controller comprising a processor in a security management system, the method comprising:
receiving, by the processor, a first security policy from an interface to network security functions (I2NSF) user via a consumer-facing interface, the I2NSF user being configured to create and distribute the first security policy;
receiving, by the processor, an available security service from a developer management system;
generating, by the processor, a second security policy corresponding to the first security policy based on the security service; and
transmitting, by the processor, a packet including the second security policy for configurating the generated second security policy to a network security function (NSF) to an NSF instance,
wherein information model for the first security policy and the second security policy includes:
a name of the first security policy,
a rule to be applied by the I2NSF user,
an endpoint group, and
information for threat prevention,
wherein the rule includes:
event information to determine whether a rule condition can be evaluated or not,
condition information to check a traffic, and
action information to identify an action taken when the rule is matched,
wherein the event information includes information related to schedule the rule and activates the evaluation of the condition information,
wherein the condition information includes firewall field related IP address, DDos field to mitigate a DDos Attack, and threat-feed field being used when security rule condition is based on existing threat reports gathered by other sources,
wherein the action information includes a primary action to perform based on a traffic class and a secondary action for generating a log record related to security,
wherein the primary action includes information for "pass", "drop", "rate-limit" and "mirror", and
wherein the secondary action includes information for "rule log" and "session log".

2. The method of claim 1, wherein the endpoint group includes:
a user group related to the I2NSF user,
a device group related to the security management system, and
a location group related to a location of the security management system.

3. The method of claim 2, wherein the first security policy further includes:

(1) a control group including one or more members of the user group subject to access rights to the consumer-facing interface, and
(2) a rule-list for granting the access rights to the consumer-facing interface.

4. The method of claim 3, wherein the rule-list includes:
a rule name,
information of an access operation,
information of a module related to the access operation, and
information of the access rights.

5. The method of claim 4, wherein the access operation instructs reading, creating, updating or deleting of the module.

6. The method of claim 4, wherein the access rights instruct whether to permit or deny the access operation.

7. A security controller for providing a security service in a security management system, the security controller comprising:
a transceiver;
a memory; and
a processor configured to functionally control the transceiver and the memory;
wherein the processor is configured to:
receive a first security policy from an interface to network security functions (I2NSF) user via a consumer-facing interface via the transceiver, the I2NSF user being configured to create and distribute the first security policy;
receive an available security service from a developer management system;
generate a second security policy corresponding to the first security policy based on the security service; and
transmit a packet including the second security policy for configurating the generated second security policy to a network security function (NSF) to an NSF instance via the transceiver,
wherein information model for the first security policy and the second security policy includes:
a name of the first security policy,
a rule to be applied by the I2NSF user,
an endpoint group, and
information for threat prevention,
wherein the rule includes:
event information to determine whether a rule condition can be evaluated or not,
condition information to check a traffic, and
action information to identify an action taken when the rule is matched,
wherein the event information includes information related to schedule the rule and activates the evaluation of the condition information,
wherein the condition information includes firewall field related IP address, DDos field to mitigate a DDos Attack, and threat-feed field being used when security rule condition is based on existing threat reports gathered by other sources,
wherein the action information includes a primary action to perform based on a traffic class and a secondary action for generating a log record related to security,
wherein the primary action includes information for "pass", "drop", "reject", "rate-limit" and "mirror", and
wherein the secondary action includes information for "rule log" and "session log".

8. The security controller of claim 7, wherein the endpoint group includes:
a user group related to the I2NSF user,
a device group related to the security management system, and
a location group related to a location of the security management system.

9. The security controller of claim 8, wherein the first security policy further includes:
(1) a control group including one or more members of the user group subject to access rights to the consumer-facing interface, and
(2) a rule-list for granting the access rights to the consumer-facing interface.

10. The security controller of claim 9, wherein the rule-list includes:
a rule name,
information of an access operation,
information of a module related to the access operation, and
information of the access rights.

11. The security controller of claim 10, wherein the access operation instructs reading, creating, updating or deleting of the module.

12. The security controller of claim 10, wherein the access rights instruct whether to permit or deny the access operation.

* * * * *